Figure 1:
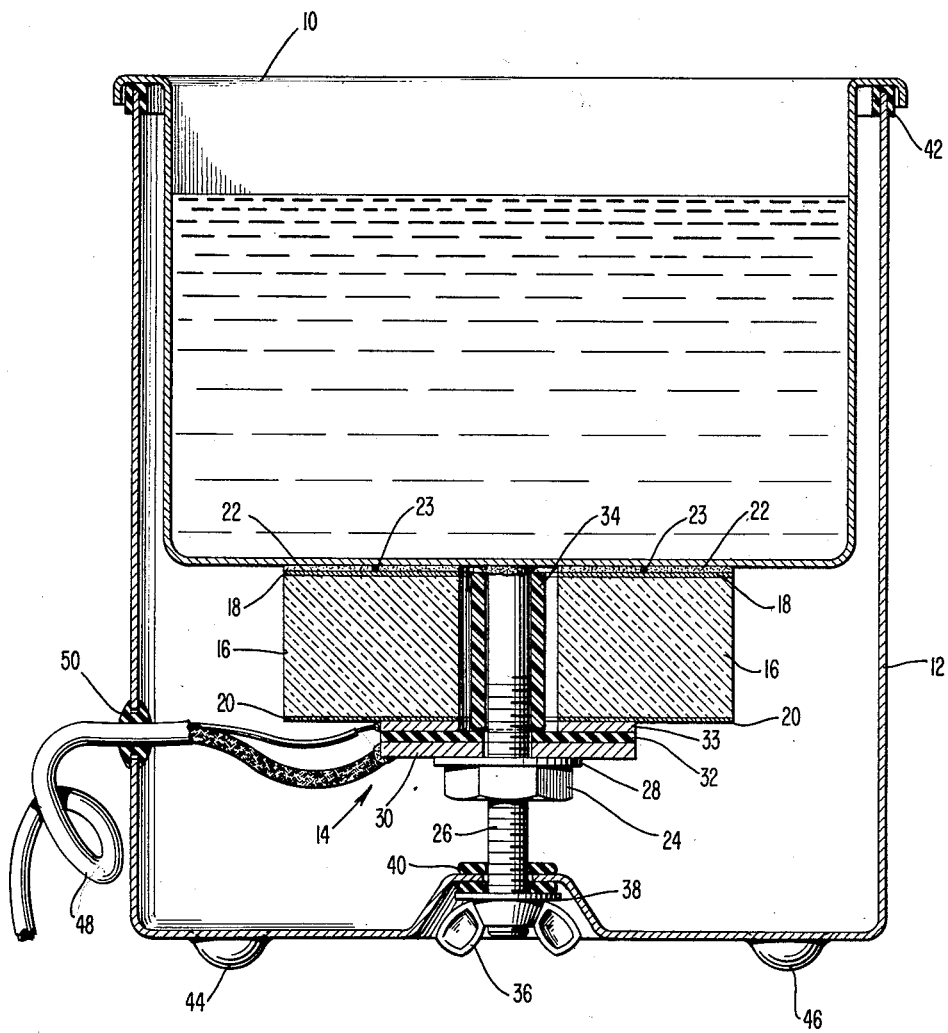

Dec. 10, 1963 P. M. PLATZMAN 3,113,761
ULTRASONIC TANK HOUSING
Filed July 26, 1961 2 Sheets-Sheet 1

INVENTOR.
PAUL M. PLATZMAN
BY
Roy C. Hapgood
ATTORNEY

Dec. 10, 1963   P. M. PLATZMAN   3,113,761
ULTRASONIC TANK HOUSING
Filed July 26, 1961   2 Sheets-Sheet 2

INVENTOR.
PAUL M. PLATZMAN
BY
Roy C. Hapgood
ATTORNEY

United States Patent Office 3,113,761
Patented Dec. 10, 1963

3,113,761
ULTRASONIC TANK HOUSING
Paul M. Platzman, Brookville, N.Y., assignor to Ultrasonic Industries Inc., Plainview, N.Y., a corporation
Filed July 26, 1961, Ser. No. 127,021
15 Claims. (Cl. 259—72)

This invention relates in general to ultrasonic tanks and in particular to a housing for supporting ultrasonic tanks. The invention is characterized by a novel ultrasonic tank housing member and by a novel means of securing the ultrasonic tank to the housing member. The invention can be used in connection with ultrasonic tanks of any size, but it is particularly useful in portable ultrasonic tanks such as used for cleaning electronic components, watches, clocks, precision instruments, surgical instruments, dentures, eyeglasses, jewelry, or other relatively small objects.

Many portable ultrasonic cleaners have been manufactured in the prior art for the purpose of cleaning relatively small objects These prior art ultrasonic cleaners contained an ultrasonic tank member which was fitted on the bottom with an ultrasonic transducer such as barium titanate or the like which, when excited by electrical oscillations, vibrated the bottom of the tank at ultrasonic frequencies. These ultrasonic vibrations were transmitted through the fluid in the tank member, and they acted to clean the contaminants, corrosion and stain off small objects immersed in the tank. The tank member and its ultrasonic transducer were supported in a portable housing member that was open at the top and fitted with a removable bottom which was attached to the housing member by screws or the like. The tank member, which had outwardly projecting flanges at its top, was permanently secured to the top of the housing member by brazing, soldering, welding, riveting, or by an epoxy cement bond so that the tank and the housing formed one rigid assembly. A coaxial cable was fed through the lower side of the housing member to apply electrical energy to the ultrasonic transducer at the bottom of the tank.

Although the above noted prior art ultrasonic cleaners were workable, they had several serious drawbacks that related to the housing portions of the assembly. First, because there was a rigid joint between the ultrasonic tank and the housing, the ultrasonic vibrations of the tank were coupled to the housing, and the housing absorbed a large amount of the available cleaning energy. It is desirable, of course, that all of the ultrasonic energy be utilized solely to agitate the cleaning solution, and that none of the energy be wasted in vibrating the housing. Also, due to the permanent joint between the tank and the housing, there was no way to separate one from the other. This meant that the entire assembly had to be replaced if the housing or tank was damaged. It also meant that the assembly had to be turned upside down to gain access to the transducer, by way of the removable bottom, to repair or replace the transducer element. Furthermore, the two-piece construction of the housing member was relatively costly to manufacture because the two pieces had to be manufactured separately, and painted separately, and stored separately, and catalogued separately, and assembled together before the device was completed. These factors are particularly important in a highly competitive market such as found today in the ultrasonic cleaner field. In addition, this prior art tank assembly provided no way for adjusting the intensity of excitation in the tank, and it was inconvenient to repair because of the limited space provided for access to the ultrasonic transducer element.

Accordingly, one object of this invention is to provide an ultrasonic tank housing which is simpler in structure, easier to assemble, and more efficient than those heretofore known in the art.

Another object of this invention is to provide novel means for removably securing an ultrasonic tank to its housing in such manner as to provide an adjustment for the level of excitation in the tank.

A further object of this invention is to provide an ultrasonic cleaner assembly which is more efficient in operation, less expensive in construction, and easier to repair than those heretofore known in the art.

Figure 2:
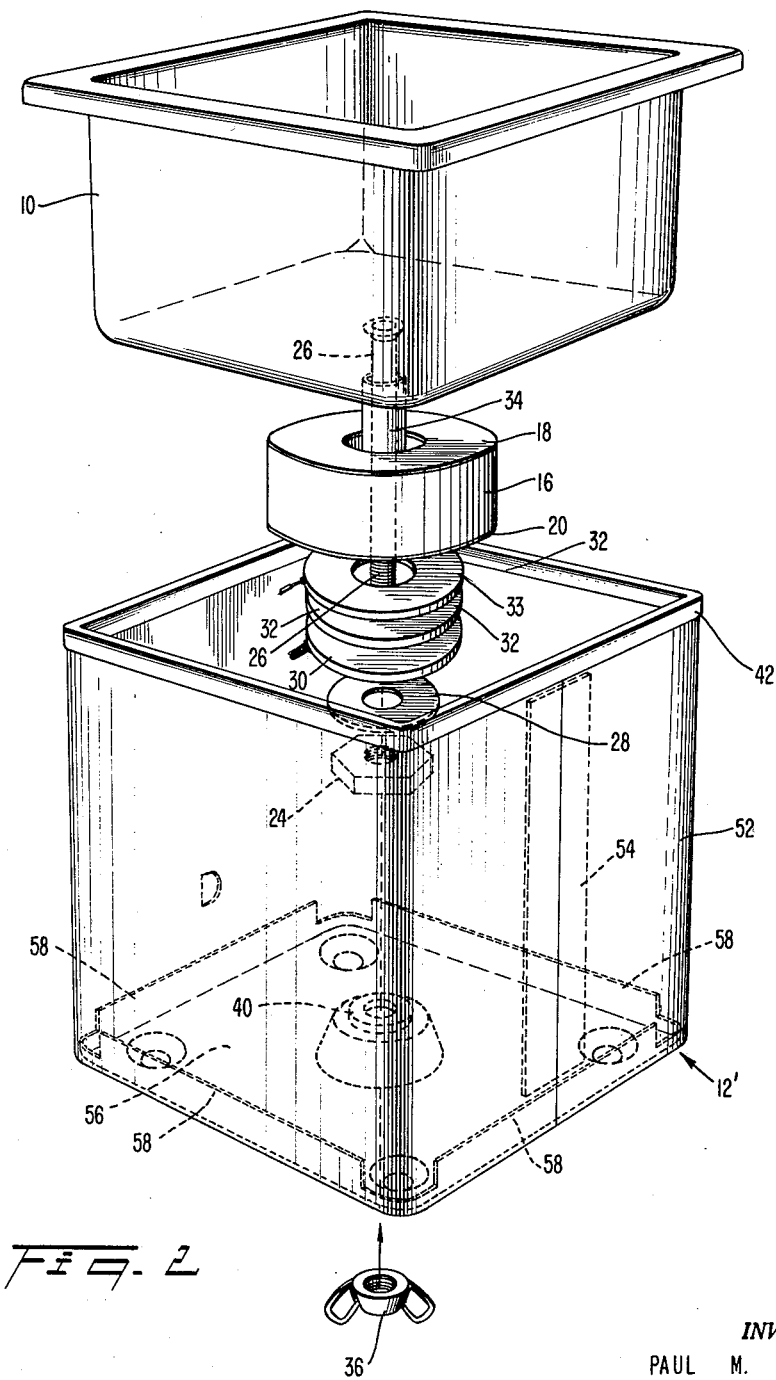

Other objects and advantages of this invention will become apparent to those skilled in the art from the following description of two specific embodiments thereof, as illustrated in the attached drawings, in which:

FIG. 1 is an elevation section taken through one illustrative embodiment of this invention; and FIG. 2 is an exploded perspective view of a second embodiment of this invention.

Referring to FIG. 1, the ultrasonic cleaner assembly of this invention comprises a tank member 10, a housing member 12, and an ultrasonic transducer 14. Tank 10 is preferably made of stainless steel. Ultrasonic transducer 14 contains a cylindrical piece of barium titanate 16 which is bonded to two thin metallic plates 18 and 20, which serve as electrical conducting surfaces. Plates 18 and 20 can comprise sheets of metal foil or they can comprise a thin layer of solder. When a potential is applied between the metallic plates 18 and 20, barium titanate 16 will expand or contract in accordance with well known prior art principles, and if the potential alternates at ultrasonic frequencies barium titanate 16 will expand and contract at ultrasonic frequency and thus excite any structure to which it is attached. The transducer is acoustically coupled and mechanically bonded to the bottom of ultrasonic tank 10 by means of a cement joint 22. The transducer is further mechanically secured to the bottom of tank 10 by means of nut 24, which engages a long stud 26 fastened to the bottom of tank 10 in the center of an opening cut in the transducer. Nut 24 presses the ultrasonic transducer against the bottom of tank 10 via a lock washer 28, a large metal washer 30, an insulator disc 32, and an electrical contact disc 33. The upper plate 18 of the transducer is electrically coupled to the bottom of tank member 10 by a conductor 23 which is embedded in cement 22. Stud 26 is insulated from the barium titanate 16 by an insulated sleeve 34 which extends through the hole in the transducer.

The ultrasonic cleaner assembly of this invention differs from the prior art devices in that tank 10 is secured to the bottom of housing member 12 instead of to the top thereof, and in that the joint between the two is temporary rather than permanent. In accordance with this invention, stud member 26 is elongated so as to extend through the bottom of housing member 12 and is secured to the bottom of housing member 12 by means of wing nut 36, washer 38, and resilient grommet 40. The bottom of housing member 12 is preferably indented around the opening cut to receive stud 26 so as to expedite the removal of nut 36 or adjustment of the joint between tank 10 and housing 12. The top flange of tank 10 rests upon a resilient gasket 42 which extends around the open edge of housing member 12. Feet 44 and 46 are preferably formed on the bottom of housing member 12 to support the assembly, and a coaxial cable 48 is introduced into the side of the housing via a second grommet 50. The coaxial cable is coupled across the barium titanate transducer at one end and is adapted at its other end to be coupled to an ultrasonic frequency electrical oscillator, which is not shown in the drawings. In operation, tank 10 is filled with aqueous solutions, solvents or other cleaning fluids, and electrical excitation is applied to coaxial cable 48. Transducer 14 then excites the bottom of tank 10 at ultrasonic frequency and sets up ultrasonic frequency waves in the fluid. Any objects which are immersed in the fluid will then be cleaned in accordance with well known prior art ultrasonic cleaning principles.

The ground conductor of coaxial cable 48 is connected to washer 30, which is electrically coupled to metallic plate 18 via stud 26, the bottom of tank 10, and conductor 23. The central conductor of coaxial cable 48 is connected to metallic plate 20 via electrical contact disc 33. Contact disc 33 is preferably smaller in diameter than the transducer so that the lower surface of the transducer is substantially air loaded, thereby providing a high acoustical impedance which will reduce radiation losses from the lower, non-working surface of the transducer. With this arrangement, which constitutes another important novel feature of this invention, substantially all of the ultrasonic energy is transmitted upward into the tank. The acoustic insulator at the top of the tank prevents the energy from being absorbed in the skirt assembly, so that substantially all of the ultrasonic energy goes into agitating the liquid and cleaning objects immersed therein.

In the above described embodiment of the invention, it is preferable to use a cylindrical transducer element, as shown, to obtain symmetrical acoustic loading, which provides a maximum conversion of electrical energy to acoustic power and an even distribution of acoustic energy over the entire radiating face of the transducer. Electrical contact disc 33 is preferably circular in shape to eliminate arcing by virtue of an even distribution of contact pressure between disc 33 and conductor plate 20.

The advantages of the ultrasonic cleaner assembly of this invention can be readily appreciated by those skilled in the art. The transducer directs substantially all of the ultrasonic energy upward, and it is prevented from reaching the housing by resilient gasket 42, which acts both as a liquid seal and as an acoustic vibration insulator between the tank and the housing. The small amount of acoustic energy that is directed downwardly is insulated from the housing by resilient grommet 40, which prevents any coupling of energy from stud 26 to the bottom of the housing. Furthermore, as wing nut 36 is tightened, the damping effects of gasket 42 and grommet 40 are reduced, so that wing nut 36 comprises an adjustment for the level of ultrasonic vibration in the tank.

The ultrasonic cleaner assembly of this invention is also much simpler in structure than the prior art devices due to the fact that the housing member 12 can be formed as a single piece by the deep draw process, which significantly reduces the cost of manufacturing the device. The single piece housing eliminates several steps in the fabrication of parts; one step in painting; and one step in assembly. Furthermore, the single piece housing eliminates one part from the assembly, which simplifies the problems of storage and inventory. In addition to these advantages, the novel assembly of this invention also provides the advantage of easy disassembly. The tank member 10 can be quickly and easily removed from the housing member 12 by merely removing wing nut 36. When the tank member is removed, unlimited acess is provided to the transducer member for repair or replacement.

FIG. 2 shows an alternate construction for the housing member which can be used in tank assemblies which are too large for the single piece housing structure shown in FIG. 1. In FIG. 2 a large housing member 12′ is formed from a flat sheet of metal which is bent to follow the shape of tank 10 and which is butt joined to form a skirt member 52 that is open at both ends. The butt joint is reinforced by a strip 54 which is seam welded to the inside of the skirt member as shown. The bottom of skirt member 52 is permanently closed by a bottom plate 56 which contains upwardly projecting flanges 58. The outside dimensions of the bottom plate are slightly smaller than the inside dimensions of the skirt member so that the bottom plate can be easily slid inside of the skirt member and permanently secured therewithin by seam or spot welding the flanges to the skirt member. Bottom plate 56, of course, must be adapted to receive stud 26, and it is preferably indented to provide room for a wing nut 36. Except for the construction of the housing, this embodiment of the invention is otherwise identical with the embodiment shown in FIG. 1. This particular construction of the skirt member is not as economical as the single piece deep draw construction, but it is more economical than the prior art structure since it requires only one painting operation and can be treated as a single piece in the records. Furthermore, this particular construction has all of the other advantages pointed out for the single piece construction shown in FIG. 1, and it may be preferable in embodiments which are too large for a single piece deep drawn housing.

Although this invention has been described in connection with specific examples, it should be clearly understood that the invention is by no means limited to the specific structure disclosed herein since many modifications can be made in the structure disclosed without departing from the basic teaching of this document. For example, the barium titanate transducer can be replaced by a magnetostrictive transducer or any other suitable ultrasonic transducer if desired. Furthermore, the transducer does not have to be of the exact shape disclosed herein, not is it necessarily restricted to a single transducer. The single transducer shown herein can be replaced by a plurality of transducers having any desired location without affecting the basic operation of this invention. When a plurality of transducers are used, it will not be necessary to use long studs on all of the transducers, since the tank can be adequately secured to the housing by one or two long studs. In addition, it will not be necessary to include the resilient grommets in all embodiments of the invention. In many cases the material used for the bottom plate of the housing, and the shape of the indentation formed therein, will provide the desired variable damping of vibrations without a resilient grommet. The grommet around the coaxial cable can be eliminated in almost every case if desired. These and many other modifications will be apparent to those skilled in the art and this invention includes all modifications falling within the scope of the following claims.

I claim:

1. An ultrasonic device comprising an ultrasonic tank member having an open top and a flange extending laterally around the periphery of said open top and a stud member projecting downwardly from the bottom of said tank member, resilient tank mounting means in contact with said flange, a unitary housing member having an open top and a closed bottom, said housing member being adapted to receive said tank member, the top of said housing being adapted to engage said resilient mounting means and the bottom thereof being adapted to receive said stud, means for removably securing said stud to the bottom of said housing member, an ultrasonic transducer secured to the bottom of said tank member, and means coupled between the bottom of said ultrasonic tank member and the bottom of said housing member for adjusting the intensity of excitation in said tank member.

2. The combination defined in claim 1 wherein the bottom of said housing member contains an upwardly projecting recess having an opening formed in the center thereof to recesive said stud and wherein said stud is resiliently secured to said housing member by means including a nut engaging said stud within said recess.

3. The combination defined in claim 2 and also including resilient means coupled between said nut and the bottom of said housing member, said resilient means, said stud and said nut comprising said means for adjusting the intensity of excitation in said ultrasonic tank member.

4. The combination defined in claim 3 wherein said ultrasonic transducer contains a central opening therein and wherein said transducer is secured to the bottom of said ultrasonic tank member with said stud projecting through said central opening therein.

5. The combination defined in claim 4 and also including a second nut engaging said stud below said ultrasonic transducer to secure said ultrasonic transducer to the bottom of said ultrasonic tank member.

6. An ultrasonic device comprising a hollow ultrasonic tank member having an open top and a laterally projecting flange extending around the periphery of said top, said tank member being adapted to receive a fluid, a relatively long stud member secured to the bottom of said tank member and projecting downwardly therefrom, a hollow unitary housing member having an open top and a closed bottom, the top of said housing member being adapted to receive said ultrasonic tank member and to engage said flange thereof, a resilient gasket member covering the top of said housing member, an opening cut in the bottom of said housing member to receive said stud, an ultrasonic transducer mounted on the bottom of said tank member, means for securing said stud to the bottom of said housing member, and means coupled between the bottom of said ultrasonic tank member and the bottom of said housing member for adjusting the intensity of excitation in said tank member.

7. The combination defined in claim 6 wherein said ultrasonic transducer contains a central opening formed therein and wherein said ultrasonic transducer is secured to the bottom of said tank member with said stud projecting through said central opening therein and wherein said ultrasonic transducer is secured to the bottom of said tank by means of a nut engaged on said stud below said ultrasonic transducer, and wherein said stud is secured to the bottom of said housing member by means of a second nut engaged on said stud below the bottom of said housing member.

8. The combination defined in claim 7 and also including a resilient grommet placed between said second nut and the bottom of said housing member, said resilient grommet said stud and said second nut comprising said means for adjusting the intensity of excitation in said ultrasonic tank member.

9. The combination defined in claim 8 and also including an upwardly projecting recess formed in the bottom of said housing member around said opening therein, said recess being adapted to receive said second nut and to allow quick removal thereof.

10. The combination defined in claim 9 and also including an opening cut in the side of said housing member and an electrical conductor extending through said opening, said electrical conductor being coupled to said ultrasonic transducer at one end and being adapted at the other end to be coupled to a source of electrical energy.

11. A housing for an ultrasonic tank having an open top, a closed bottom, a flange projecting laterally around the periphery of said open top, and a stud member projecting downwardly from said closed bottom, said housing member comprising a hollow, unitary housing member having an open top and a closed bottom, the top of said housing member being adapted to receive said ultrasonic tank and to engage said flange thereof, a resilient gasket member covering the top edge of said housing member, an ultrasonic transducer secured to the bottom of said tank, an opening cut in the bottom of said housing member to receive said stud, and means resiliently coupling said stud to the bottom of said housing member for adjusting the intensity of excitation in said tank.

12. The combination defined in claim 11 wherein said resilient coupling means includes a resilient grommet surrounding the opening cut in the bottom of said housing member.

13. The combination defined in claim 12 and also including an upwardly projecting recess formed in the bottom of said housing member around said opening therein.

14. The combination defined in claim 13 wherein said housing member is formed in a single, unbroken piece.

15. The combination defined in claim 13 wherein said housing member comprises a skirt member which is open at both ends thereof and a bottom member which is secured to one end of said skirt member.

References Cited in the file of this patent

UNITED STATES PATENTS

| | | |
|---|---|---|
| 2,363,365 | Schmitt | Nov. 21, 1944 |
| 2,815,193 | Brown | Dec. 3, 1957 |

FOREIGN PATENTS

| | | |
|---|---|---|
| 647,270 | Germany | of 1937 |